Oct. 20, 1953         R. D. HENDERSON          2,655,985
       CIRCUMFERENTIALLY TRAVELING SUPPORT-MOUNTED
                    TIRE MOUNTING APPARATUS
Filed Sept. 23, 1950                        3 Sheets-Sheet 1
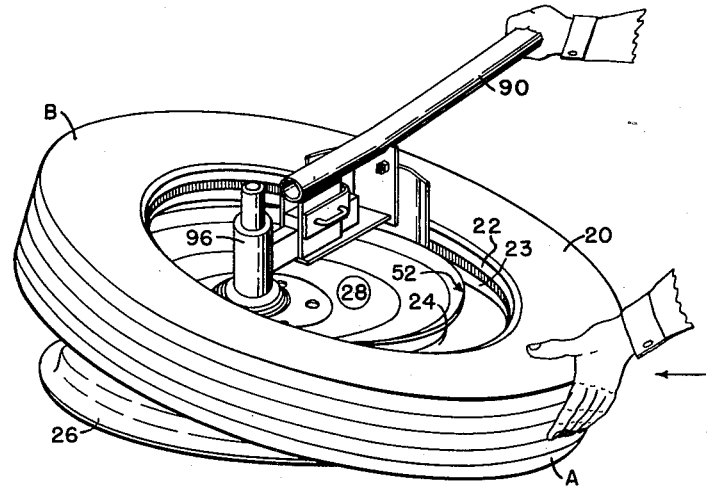
FIG. 1
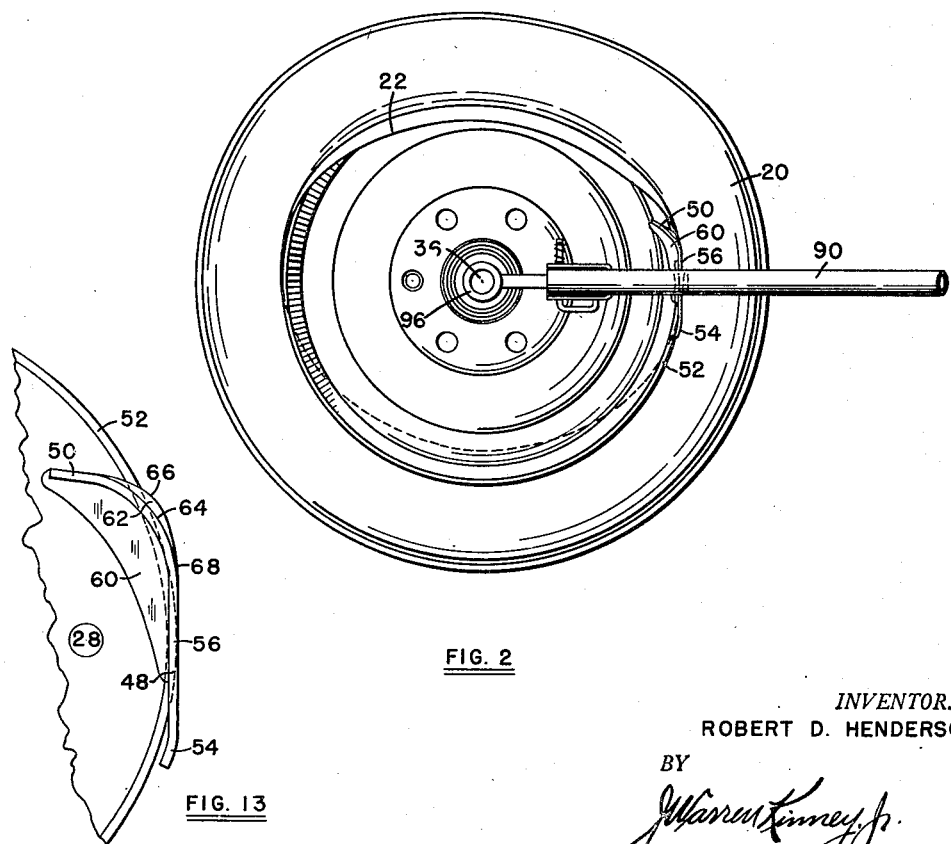
FIG. 2
FIG. 13
INVENTOR.
ROBERT D. HENDERSON
BY
ATTORNEY

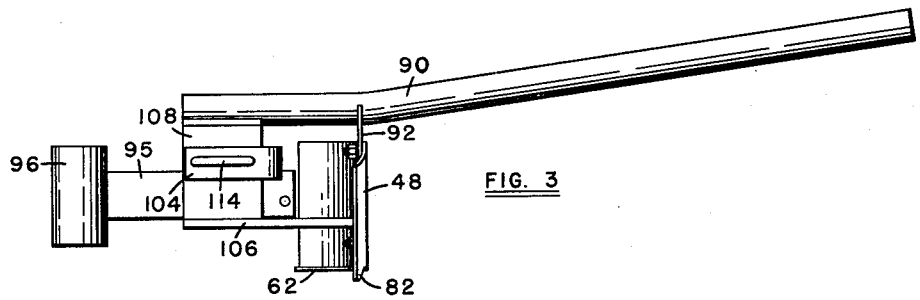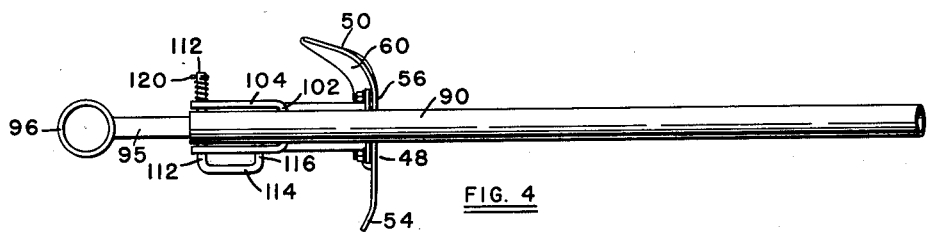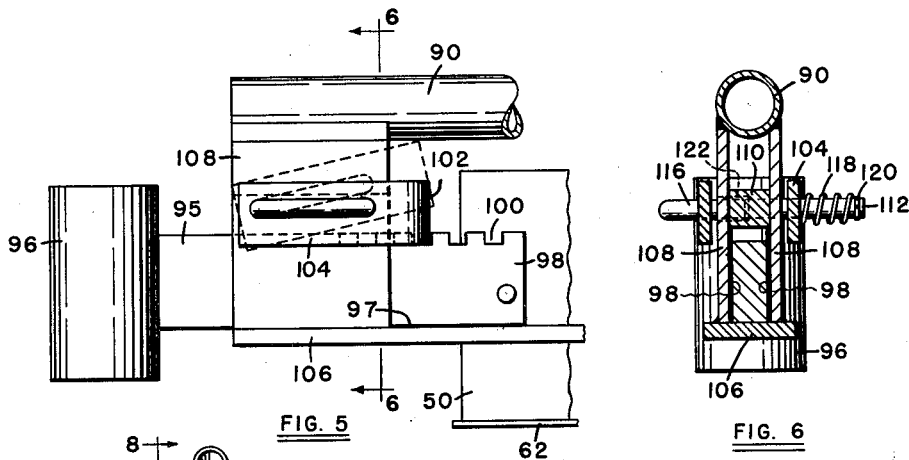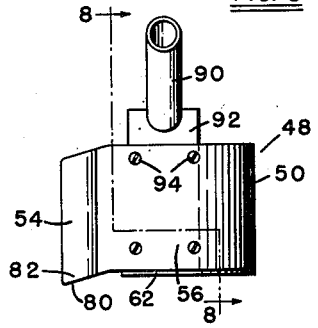

Oct. 20, 1953  R. D. HENDERSON  2,655,985
CIRCUMFERENTIALLY TRAVELING SUPPORT-MOUNTED
TIRE MOUNTING APPARATUS
Filed Sept. 23, 1950  3 Sheets-Sheet 3
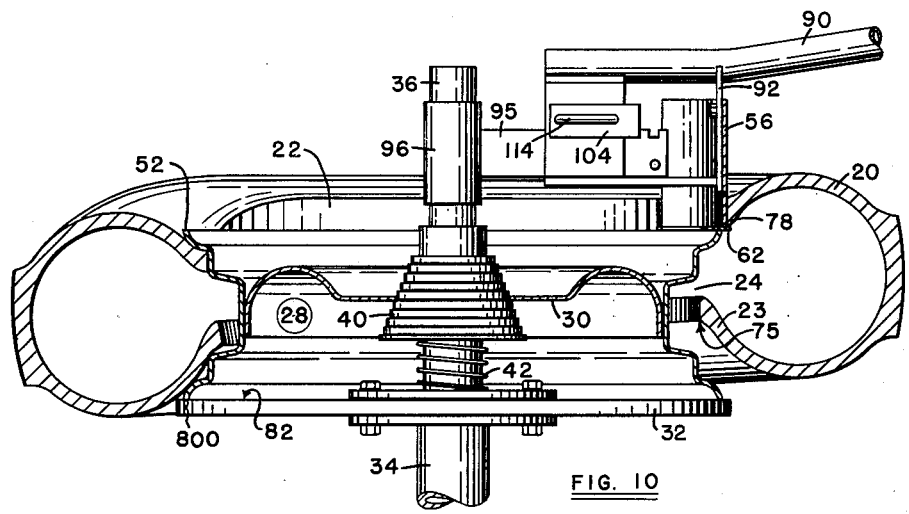
FIG. 10
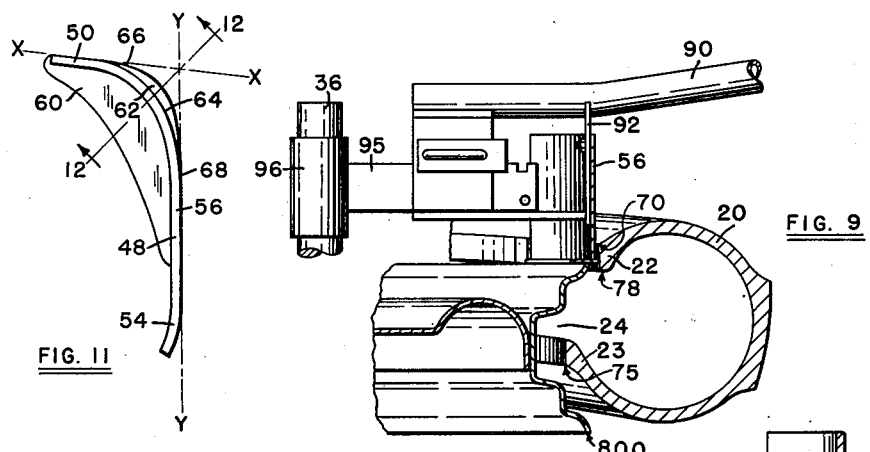
FIG. 11
FIG. 9
FIG. 8
FIG. 12
INVENTOR.
ROBERT D. HENDERSON
BY
J. Warren Kinney Jr.
ATTORNEY Patented Oct. 20, 1953

2,655,985

UNITED STATES PATENT OFFICE 2,655,985

CIRCUMFERENTIALLY TRAVELING SUPPORT-MOUNTED TIRE MOUNTING APPARATUS

Robert D. Henderson, Cincinnati, Ohio

Application September 23, 1950, Serial No. 186,437

2 Claims. (Cl. 157—1.24)

This invention relates to a tire mounting device and particularly to a circumferentially traveling support-mounted tire mounting apparatus.

An object of the invention is to provide a tire mounting device which includes a plate or blade portion constructed and arranged to ride upon the outer periphery of the rim portion of a wheel whereby to sequentially mount portions of the bead of a tire over and thence under the rim edge.

A further object of the invention is to provide a tire mounting tool which includes a lip portion which is constructed and arranged to be engaged by the upper bead of a tire for securely positioning the blade in contacting supported relationship with the outer periphery of the wheel thereby securely though releasably locking the device relative to the wheel.

Another object of the invention is to provide a tire mounting device which includes means for varying the reach of the device for accommodating wheels and tires of various diameters.

Still another object of the invention is to provide a tire mounting device which is particularly adapted for mounting the so-called tubeless pneumatic tires.

A further object of the invention is to provide a tire mounting tool having the hereinabove described characteristics and which includes a lip on which the upper bead of a tire casing will be supported for precluding contact of the bead with the peripheral side edge of the rim of a wheel incident to movement of the bead relative to and across the peripheral side edge of the rim during a casing mounting operation.

These and other objects are attained by the means described herein and as disclosed in the accompanying drawings, in which Fig. 1 is a perspective view illustrating the first step in mounting a pneumatic tire casing onto the rim of a wheel using the tire mounting apparatus of the present invention.

Fig. 2 is a top view of the apparatus of Fig. 1 showing the relationship of the parts after the lower bead has been completely mounted onto the wheel rim and after the mounting tool has applied upper bead 22 onto the wheel rim throughout approximately 180 degrees.

Fig. 3 is a plan view of a tire mounting device constructed in accordance with the teachings of the present invention.

Fig. 4 is a top plan view of the device of Fig. 3.

Fig. 5 is an enlarged side view of the left end of the device of Fig. 3 illustrating certain operating details thereof.

Fig. 6 is a view taken on line 6—6 of Fig. 5.

Fig. 7 is a view of the right end of the device of Fig. 3.

Fig. 8 is a partial view illustrating the relationship of a wheel, tire and mounting tool before lip 62 of the mounting blade has been introduced under upper bead 22, wherein the section through the mounting blade has been taken on line 8—8 of Fig. 7.

Fig. 9 is a view similar to Fig. 8, showing the relationship of the parts after the tool has been rotated somewhat.

Fig. 10 is a view illustrating the relationship of the parts when the mounting tool has been rotated to the relationship of Fig. 2, and wherein the section through the mounting plate, blade and lip has been taken along line 12—12 of Fig. 11.

Fig. 11 is a top view of the mounting blade portion of the tool.

Fig. 12 is an enlarged view of a portion of Fig. 10 for the purpose of clarity of detail and understanding.

Fig. 13 is a view similar to Fig. 11 but illustrating the relationship of the plate, blade and lip of the device with respect to the peripheral edge of a rim.

At the outset it should be clearly understood that the tire mounting device of the present invention has been designed specifically for mounting pneumatic tire casings onto drop center rims, and comprises an improvement of the subject matter of my co-pending patent application for a Circumferentially Traveling Support Mounted, Tire Mounting Apparatus, Serial No. 670,271, filed May 16, 1946, now issued as United States Patent No. 2,534,515.

With reference now to Fig. 1, the numeral 20 denotes a pneumatic tire casing which may be of the tube type or of the so-called tubeless type, said casing including a pair of laterally spaced circumferential upper and lower beads denoted generally by the numerals 22 and 23, respectively, which are adapted to be received within wall portion 24 of the rim 26 of a standard wheel assembly 28.

As best disclosed in Fig. 10, wheel 28 includes an annular web portion 30 provided with a central aperture dimensioned to receive a complementary mounting flange of a brake drum housing. When it is desired to mount a tire casing on a wheel, it may be suitably supported upon a table 32 (see Fig. 10) secured to and carried by a supporting column 34.

A centrally disposed shaft 36 may extend upwardly from and at right angles to table 32.

Preferably a self-centering and wheel locking supporting device may be carried by the table, said device comprising a stepped cone 40, cone elevating spring 42 and a lock pin, not illustrated herein, but as fully disclosed in my U. S. Patent No. 2,481,926, dated September 13, 1949. It should, of course, be understood that any suitable means may be employed for axially centering the wheel relative to plate 32 and shaft 36 and of securing the wheel against rotation about the shaft.

With reference now to Fig. 1, it will be noted that the first step to be followed in mounting a tire casing onto the rim of a wheel is to place the casing over the wheel in such a manner as to dispose the mean plane of the casing at an angle with the plane of the wheel whereby one side of the casing will be disposed below the wheel, as at A, and the opposite side, B, above the other side of the wheel.

After the casing has thus been introduced over the wheel, the mounting tool may be rotatably secured to shaft 36 for disposing the forward or leading portion 50 of a mounting blade 48 interiorly of the side peripheral edge 52 of the rim and for disposing the trailing portion 54 exteriorly of the side peripheral edge of the rim and for disposing intermediate portion 56 which interconnects leading portion 50 and trailing portion 54 across the side peripheral edge of the rim, see Figs. 2 and 13.

At this point it should be noted that the hereinabove described leading intermediate and trailing portions of the mounting blade are substantially similar in structure and function to corresponding parts of the device described in my copending patent application, Serial No. 670,271, supra, wherefore a more detailed explanation of the mounting blade is deemed unnecessary.

A bearing plate 60 is secured to and carried by the lower edges of the intermediate and forward portions of the mounting blade, said bearing plate underlying and being disposed in a plane at substantial right angles with the planes of the leading, intermediate and trailing portions of said mounting blade. Bearing plate 60 is constructed and arranged to abuttingly engage and ride upon peripheral side edge 52 of the rim of a wheel, thereby spacing the lowermost edges of the intermediate and leading portions 56 and 50, respectively, of the blade from or above said peripheral side edge.

The bearing plate includes a lip portion 62 which, as best disclosed in Figs. 11, 12 and 13, extends outwardly beyond outer face 64 of leading portion 50 of the blade, whereby to extend outwardly of and beyond the peripheral side edge of the rim, thereby providing an arcuate supporting surface engageable by the bead of a tire casing.

With further reference to Fig. 11, it will be noted that in the preferred embodiment of the invention leading edge 66 of lip 62 is substantially tangential with axis X—X through the outer face of the leading portion 50 of blade 48. It will likewise be noted that the trailing portion 68 of the lip is substantially tangential with the axis Y—Y of the outer face of intermediate portion 56, thereby providing an arcuate or segmental shape to the supporting surface of lip 62, the area of which is a maximum adjacent the center portion such as along line 12—12, tapering off at its opposite ends into tangency with the leading and intermediate portions.

It has been determined that uniformly excellent results will be obtained when the overhang of lip 62 at its central or maximum portion is in the neighborhood of ⅛ of an inch.

With particular reference now to Fig. 8, it will be noted that the upper edge 70 of bead 22 will engage the lower surface of lip 62 as the mounting tool is first rotated in a counter-clockwise direction after the casing of Fig. 1 has been urged forwardly for disposing beads 22 and 23 of lowermost portion A into well 24 of the rim. As the tool is rotated about shaft 36, the forward or leading portion 50 of the blade will progressively engage portions of upper bead 22 in advance of intermediate portion 56 for sequentially displacing portions of the bead outwardly relative to the peripheral side edge of the rim and for sequentially presenting portions of the bead onto and in engagement with outer face 64 of intermediate portion 56 of the blade. Further rotation of the blade will automatically result in further outward displacement of the bead as it passes rearwardly along the intermediate portion of the blade, after which the bead will be introduced onto trailing portion 54 thence downwardly and under lower edge 80 of trailing portion 54 which includes a depending element 82, which overhangs and extends outwardly of and below the peripheral side edge 52 of the rim. As the bead is introduced under lower edge 80 of depending element 82 it is introduced into well 24 of the rim.

As the tool is further rotated about shaft 36 upper or outer edge 70 of upper bead 22 will be freed from engagement beneath lip 62 whereby the bead will climb upwardly, as it were, and the outer face 76 of lip 62 will abuttingly engage the inner face of bead 22 between upper, outer edge 70 and lower, inner edge 78, see Fig. 9.

After the mounting tool has been further rotated the casing will assume the relative position on the wheel as that illustrated in Fig. 2, wherein lower edge 78 of the bead will be disposed upon and supported by the upper face of lip 62, see Figs. 10 and 12. When this relationship has been obtained, the action of bead 22 will be such as to exert a positive and continuous force against the upper surface of the lip of the bearing plate, thereby disposing the undersurface of said plate in positive, contacting abutment with the peripheral side edge 52 of the wheel rim. In this manner the mounting tool is positively locked relative to shaft 36 in such a manner as to preclude relative axial motion along or relative to shaft 36, and exerting a positive downward pressure onto the peripheral side edge of the wheel of such magnitude as to securely lock the lower peripheral edge 80 of the wheel onto and in abutting relationship with upper surface 82 of table 32, thereby rendering unnecessary the need for auxiliary locking means, such as disclosed in Patent No. 2,481,926, once the lower edge 78 of the tire casing engages the upper face of the lip 62.

Lip 62 will, as is clearly evident from Fig. 12, support the lower, inner peripheral edge 78 of bead 22, thereby precluding contact of said bead edge with the peripheral side edge 52 of the wheel during transition of those portions of the bead from a location interiorly of the side peripheral edge of the rim to its position exteriorly of the side peripheral edge of the rim; thereby precluding damage to lower, inner edge or tip 78 of the upper bead incident to movement of the bead relative to and across the peripheral side edge of the rim.

As progressive portions of the tire bead are directed into the rim through rotation of the tire mounting tool, the length of that portion of the bead which remains unmounted becomes smaller and smaller and the unmounted bead portion assumes positions which are progressively less chordal than that shown in Figure 2. As the chordal distance becomes shorter and shorter, the forces which are acting upon the tire tend to cause the unmounted bead portion to move toward the rim. In such circumstances, the point at the left hand side of Figure 2, where the tire bead crosses over the edge of the rim from the inside to the outside, commences voluntarily to move toward the point at which the mounting blade and lip 62 are engaging the unmounted portion of the rim, as at the right hand side of Figure 2, and, as rotation of the lever 90 continues, the bead voluntarily departs from the blade and lip 62 and finally snaps into the rim. This result occurs well before the lever has been moved through a complete revolution about the tire or has reached the crossover point shown at the left hand side of Figure 2. This result is obtained because the tensional forces to which the tire bead are subjected are reduced as the length of the unmounted chordal portion of the bead becomes shorter, and also because the inward pull of the mounted portion of the tire becomes greater as the length of the unmounted portion of the bead decreases. Thus, although the lip 62 resides beneath the unmounted portion of the bead throughout a substantial portion of the range in which the mounting blade is worked, the bead snaps from the lip and into the rim as the mounting operation approaches completion, thereby providing automatic disengagement of the lip from its normal bead supporting position.

With particular reference now to Fig. 13, it will be noted that those portions of the bead riding upon lip 62 will be automatically disengaged therefrom as the tool is rotated relative to the casing and rim for disposing the bead onto the trailing end of the lip which is tangential with the outer face of intermediate portion 56. In this manner the inner tip 78 of the bead is adequately protected from being "sheared," cut, or otherwise mutilated as it is shifted across peripheral edge 52, particularly during mounting of those portions of bead 22 in advance of the tool of Fig. 2.

At this point it should be clearly understood that lip 62 is effective only in mounting upper bead 22 since there is no danger or likelihood of damage to lower bead 23 incident to its introduction over peripheral edge 52 of the rim of the wheel since outer edge 75 of the lower bead, see Figs. 9 and 10, is heavy and quite rugged as compared with inner tip or edge 78.

In order to render my mounting tool truly universal and adaptable for mounting casings onto wheels of various diameters, blade 48 is adjustably secured to an actuator lever 90. For this purpose, as best disclosed in Figs. 3–7, a plate 92 is secured by and depends from lever 90, the intermediate portion of blade 48 being fixedly secured thereto as by means of fastening elements 94.

A radius bar 95 terminates at one end in a bearing sleeve 96 constructed and arranged to be slidably received on and rotatably engage shaft 36. The other end of the radius bar may comprise a rack including lower bearing face 97 and laterally spaced side bearing faces 98. The upper surface may be provided with a series of laterally spaced teeth 100 dimensioned to receive the lower edge of forward panel 102 of a substantially U-shaped latch member 104.

The radius bar is constructed and arranged for sliding engagement with a substantially rectangular shaped guideway defined by lower plate 106, laterally spaced side plates 108 and a top plate 110 wherein the upper portions of side plates 108 are permanently secured to and carried by the forward end of actuating lever 90, such as, by way of example, welding or the like. Latch member 104 is pivotally secured to side plates 108 by means of leg 112 which extends through opposite sides of latch member 104 and through side plates 108. Leg 112 comprises one side of a substantially U-shaped member which includes a handgrip element 114 and a locking leg 116 disposed in substantial spaced parallelism with leg 112, see Figs. 4 and 6.

As best disclosed in Fig. 6, a spring 118 may be interposed between the outer face of latch 104 and an abutment member 120 secured to and carried by the outer end of leg 112. The purpose of spring 118 is to normally and yieldingly exert a force on leg 112 for shifting handgrip portion and locking leg 116 inwardly, that is, toward the longitudinal axis of actuating lever 90 for locating the free inner end of locking leg 116 within an aperture 122 provided in top plate 110, see Fig. 6.

From the foregoing, it will be noted that when it is desirable to adjust the reach of mounting blade 48, all an operator need do is to grasp handgrip portion 114 and pull it outwardly for disengaging locking leg 116 from aperture 122 as leg 112 is retracted against the counterforce of spring 120. Latch member 104 may then be swung upwardly to the dotted position illustrated in Fig. 5, thereby enabling rack 95 to be shifted longitudinally with reference to the channel defined by plates 106, 108 and 110. After the desired setting has been obtained, latch 104 may be lowered for introducing the lower edge of its forward panel 102 into and in seating engagement with the desired tooth. Simultaneously therewith locking leg 116 will be seated within aperture 122, thereby automatically locking latching member 104 in adjusted relationship for precluding accidental or unintentional change of the reach of the device.

It should be understood that various changes and modifications may be made in the structural details of the device, within the scope of the appended claims, without departing from the spirit of the invention.

What is claimed is:

1. A tool for mounting tire casings onto drop center rims, which comprises, means for supporting a wheel upon which a tire is to be mounted, a bearing plate constructed and arranged to abuttingly engage and ride upon the outer side periphery of the rim portion of said wheel, a mounting blade fixedly secured to said plate and including leading, intermediate and trailing portions disposed in planes at substantial right angles with said bearing plate, the said leading portion of said mounting blade comprising an inturned face disposed interiorly of the peripheral side edge of the rim, the said trailing portion including a depending element which overhangs and extends outwardly of and below the peripheral side edge of the rim, and said intermediate portion interconnecting said leading and trailing portions, means for rotatably securing said mounting blade at the center of a wheel mounted on said wheel supporting means for rotation about the axial center of the wheel, and a lever for actuating said mounting blade rotationally about the rim of said wheel, said bearing plate including a lip which extends outwardly beyond the outer face of the mounting blade between its leading and intermediate portions for providing a supporting surface engageable by the inner edge of the upper bead of a tire casing being mounted onto said rim incident to translation of said bead edge across the peripheral edge of the rim.

2. A tool for mounting a tire casing onto a drop center rim, comprising, a post, an actuating lever rotatably mounted thereby, means surrounding the post for supporting a wheel upon which a tire is to be mounted, in a plane which is substantially parallel to the plane of revolution of said actuating lever, and a tire bead engaging assembly carried by said actuating lever, the said assembly having a bearing surface for engaging and riding upon the outer side periphery of a rim of a wheel which is supported by said wheel supporting means concentrically about said post, and comprising a mounting blade mounted at right angles to said bearing surface, the said mounting blade having a lead portion extending interiorly of the side peripheral edge of the rim of said wheel, a trailing portion mounted exteriorly of the side peripheral edge of the said rim and extending over the outer peripheral edge of said rim toward the rim flange at the other side of the rim, an intermediate portion interconnecting the said lead and trail portions, and a lip member projecting outwardly from the said lead portion adjacent the said bearing surface and over the peripheral side edge of the rim, generally in the plane of the wheel, to provide a ledge which is engageable by an inner edge of a bead of a tire for preventing displacement of the said tire bead engaging assembly axially of said wheel during a tire mounting operation and for precluding contact of the bead of the tire casing with the edge of the rim in transitional movement of the bead of the tire across the rim in response to rotation of said actuator.

ROBERT D. HENDERSON.

References Cited in the file of this patent

UNITED STATES PATENTS

| Number | Name | Date |
|---|---|---|
| 1,025,987 | Long | May 14, 1912 |
| 1,341,727 | Weaver | June 1, 1920 |
| 1,587,634 | Dickey et al. | June 8, 1926 |
| 1,742,590 | Freivogel | Jan. 7, 1930 |
| 2,439,615 | Smith | Apr. 13, 1948 |
| 2,534,515 | Henderson | Dec. 19, 1950 |

FOREIGN PATENTS

| Number | Country | Date |
|---|---|---|
| 246,853 | Great Britain | May 6, 1926 |
| 665,929 | Great Britain | Feb. 6, 1952 |